(12) United States Patent
Meirav

(10) Patent No.: US 10,517,306 B1
(45) Date of Patent: Dec. 31, 2019

(54) DEVICE FOR CONDITIONING BAKED GOODS

(71) Applicant: Udi Meirav, Newton, MA (US)

(72) Inventor: Udi Meirav, Newton, MA (US)

( * ) Notice: Subject to any disclaimer, the term of this patent is extended or adjusted under 35 U.S.C. 154(b) by 90 days.

(21) Appl. No.: 15/014,781

(22) Filed: Feb. 3, 2016

Related U.S. Application Data

(60) Provisional application No. 62/111,294, filed on Feb. 3, 2015.

(51) Int. Cl.
*A21C 15/00* (2006.01)
*A21D 17/00* (2006.01)

(52) U.S. Cl.
CPC ............ *A21C 15/00* (2013.01); *A21D 17/004* (2013.01); *A21D 17/008* (2013.01)

(58) Field of Classification Search
CPC .............................. A21D 17/004; A21D 17/008
USPC ......... 99/330, 331, 451, 467, 473–476, 481; 426/231, 233, 238, 241, 248, 243, 510, 426/511, 523; 219/400, 401, 601, 622, 219/680, 682, 731
See application file for complete search history.

(56) References Cited

U.S. PATENT DOCUMENTS

| | | | | |
|---|---|---|---|---|
| 4,449,026 A | * | 5/1984 | Satoh | H05B 6/6411 219/682 |
| 2004/0025910 A1 | * | 2/2004 | Kanzaki | F24C 14/00 134/95.1 |
| 2005/0056634 A1 | * | 3/2005 | Shozo | A21B 3/04 219/401 |
| 2008/0095905 A1 | * | 4/2008 | Sells | F24C 15/327 426/510 |

* cited by examiner

*Primary Examiner* — Phuong T Nguyen
(74) *Attorney, Agent, or Firm* — Cooley LLP

(57) ABSTRACT

In some embodiments, a food conditioning apparatus is provided and comprises a heating chamber configured to receive food, a steam generator configured to generate steam for the chamber, at least one heating element configured to provide dry heat to the chamber and the food therein through at least one of radiation and convection, and a control system configured to automatically operate a sequence of at least two stages. At least one stage comprises the generating for the chamber during a first duration, and at least one other stage comprises providing dry heat to the chamber for a second duration.

9 Claims, 1 Drawing Sheet

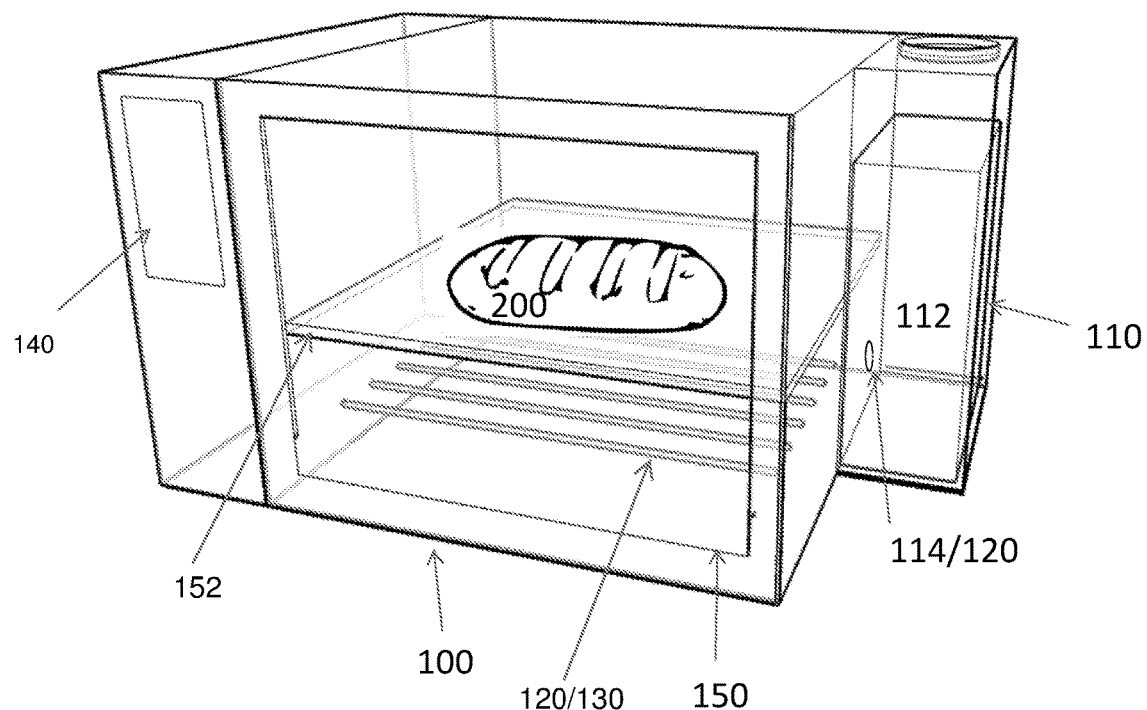

DEVICE FOR CONDITIONING BAKED GOODS

RELATED APPLICATIONS

The present application claims benefit of and priority to U.S. provisional patent application No. 62/111,294, entitled, "System and Method for Reheating Bread", filed Feb. 3, 2015, the entire disclosure of which is herein incorporated by reference.

TECHNICAL FIELD

The present application generally relates to methods and systems of food preparation and in particular methods and systems of heating or preparing breads and other baked good.

BACKGROUND

Bread is a common staple food around the world. A universally desired quality in bread is freshness, which generally means bread that has properties akin to those of bread that has been recently baked. Freshly baked bread has a moist, soft interior and a well-defined crust with thickness and texture that a characteristic of each bread style. It is not always possible to have freshly baked bread available so bread is often stored, either at room temperature or under refrigeration. As bread loses freshness, moisture escapes from within, and the crust may change its texture. Stale bread can be reheated, but reheating often results in further loss of moisture and change in texture, especially in the crust. Frozen bread maintains its humidity longer but needs to be defrosted and reheated, after which it can end up uneven, dry, or even burnt. Microwave heating of bread leads to rapid and permanent degradation of its elasticity and internal moisture. Thus challenges remain associated with bread freshness: how to revive old bread to make it taste fresh, and alternatively how to return frozen bread into warm, fresh bread.

SUMMARY OF SOME OF THE EMBODIMENTS

The present disclosure provides systems, apparatuses and methods for multiple stage (e.g., two-step) process for reheating (which may also be referred to in some embodiments as refreshing) bread and bread products, in order to recreate the properties of freshly baked bread. In some embodiments, a first step is exposure to steam, and a second step is exposure to dry heat, where both steps are performed in sequence in the same enclosure. In some embodiments, one or both steps may be cycled a plurality of times. In some instances, the steam provides both heat and moisture that can permeate into the bread, and the dry heat removes excess moisture from the crust. The same solution, with slightly modified durations of the steps, can be applied to stale bread as well as frozen bread. In some embodiments, a compact household appliance is provided to achieve such a result in an easy to use fashion.

In some embodiments, a food conditioning apparatus is provided and comprises a heating chamber configured to receive food, a steam generator configured to generate steam for the chamber, at least one heating element configured to provide dry heat to the chamber and the food therein through at least one of radiation and convection, and a control system configured to automatically operate a sequence of at least two stages. At least one stage comprises the generating for the chamber during a first duration, and at least one other stage comprises providing dry heat to the chamber for a second duration.

Such embodiments may further include one or more of the following features:
  at least one of a refillable and removable water reservoir from which water is drawn in order to produce the steam;
  a fan to assist the movement of steam and/or dry air in the chamber;
  a control system programmable for a plurality of durations and/or temperature for at least one of the stages, where at least one of the following additional features may be included:
    the control system is programmable for at least one of: temperature, air flow, and steam quantity, of at least one of the stages;
    the control system includes a user interface for programming the control system;
    the user interface configured to enable selection of one or more attributes of bread including at least one of: size, shape, age, initial condition, and one or more target qualities;
    the target qualities include at least one of crust texture, crust thickness, and internal moisture levels;
  at least one of a display and indicator, at least one of which being configured to indicate a state and/or condition of the system;
    the state and/or condition includes at least one of: the current stage, a programmed sequence, and the availability of sufficient water in the water reservoir;
  a condenser configured to at least one of condense and capture steam.

In some embodiments, a method for conditioning food is provided and comprises placing food in a substantially sealed chamber of a food conditioning apparatus, the sealed chamber being in controlled communication with a source of steam and a source of dry heat, providing steam from the steam source to the chamber during a first stage of operation for a first period of time so as to at least one of moisten and heat the food, providing dry heat to the chamber during a second stage after the first stage for a second period of time so as to at least one of heating and toasting the food.

In such embodiments, one or more of the following features may also be included:
  at least one of the providing steps is repeated;
  the providing steps are cycles a plurality of times;
  each period of time is a predetermined period of time;
  at least one of the predetermined periods of time is set by a user of the conditioning apparatus.

These and other embodiments, features, objects and advantages of the disclosure will become even more clear with reference to the detailed description below and included drawing, a brief description of which is provided below.

BRIEF DESCRIPTION OF THE DRAWINGS

FIG. 1 is a schematic illustration of a bread warming system according to an embodiment of the present disclosure;

DETAILED DESCRIPTION OF SOME OF THE EMBODIMENTS

The principle of some of the disclosed embodiments is a process that first heats the bread using steam, and then uses dry heat to complete the treatment of bread. In a first step, steam carries heat and humidity to the bread, and depending on the duration, initially hydrates the outer part of the bread, and gradually the steam and the heat diffuse to the inner parts of the bread. After sufficient exposure, the entire bread is warm and very moist, but typically the crust and outer parts are too moist or even soggy. If the starting point of the bread was at room temperature and dehydrated, the bread is now rehydrated and warm. Frozen bread may take a longer time to warm its core, but that can be done safely without drying the load thanks to the humidity of the steam.

In the second step, the steam is replaced with dry heat that is carried to the bread by radiation of convection from heating elements in or near the chamber. At the end of the first step, there is likely to be excess humidity in the outer arts of the bread which had the greatest and longest exposure to the steam. The second step provides heat to the entire bread but humidity escapes preferentially from the outer parts of the bread, where the excess humidity was created in the first step. This second step results in a warm or hot bread that is properly hydrated within, and with just the right amount of body and crispness to the crust.

In some embodiments, both steps can be performed in a single appliance with an automatically controlled sequence. FIG. 1 shows a schematic view of one embodiment of such an appliance. In this embodiment the appliance (100) is a small electric oven equipped with a water reservoir (110), a steam producing element (120), which also comprises a heating element controlled by a programmable electronic system (140) that can activate the element in a timed sequence. The bread (200) is inserted by opening the door (150) and placing the bread on the heating rack (152). The controller starts a sequence, where initially steam is produced by drawing water (112) from the reservoir, through a water inlet nozzle (114), which atomizes the water onto the steam-producing element 120 where the heating element vaporizes the water and the steam permeates the chamber. After a predetermined length of time, the steam is turned off (e.g., by closing the water inlet and/or subsequently reducing the heat on the steam producing element). Then, the controller turns on the heating element 120 and dry heat is produced in the chamber, continuing to heat the bread while gradually removing moisture from and near its surface. The dry heat can be used to toast the bread.

In some embodiments a fan can be configured to force circulation of steam and/or dry air in the chamber to accelerate or enhance uniformity of the process.

In some embodiments the heating element producing the steam and providing the dry heat is the same element, and closing the water inlet changes the chamber from steam to dry heat at the desired time.

In some embodiments, steam is produced by water coming into contact with the interior of the chamber that is heater by a heating element that does not come into direct contact with the water.

In some embodiments, the flow of water from the reservoir to the steam producing element is assisted with a small water pump. In some embodiments water is atomized as it enters the chamber through a nozzle, where it is then vaporized when coming into contact with the heating element or with the hot interior walls of the chamber.

The amount of steam in the chamber in step 1, as well as the duration of step 1, determines the degree of hydration and heating. In general, a larger loaf, or one that is very dry, or frozen, will require more steam exposure to fully hydrate and warm its center. The result, in turn, may be more excess water in the crust area, which can then be addresses by a longer duration or higher temperature of dry heat.

Water in the reservoir is replenished in any reasonable way. For example, in one embodiment, the reservoir can be removed temporarily, refilled and replaced. In another embodiment, water can be poured into the reservoir through an inlet without moving the reservoir itself. In yet another embodiment, a conduit such as a tube or pipe can be connected to the reservoir to bring water as needed. In yet another embodiment, the reservoir is not needed at all if such a water conduit is installed.

EXAMPLES

In one example, a 16 once loaf of white bread is fully frozen and it begins its treatment in a chamber with water evaporating at the rate of 2 grams per minute. After 15 minutes the loaf is warm and moist in its core and almost wet on its outside. Another 8 minutes at 350 F dry circulating air produces a warm load that has a crisp crust and a tender interior.

In another example, 2-day-old round bread rolls, each about 10 cm in diameter, are at room temperature. After 5 minutes in steam and 2 minutes in dry heat, the rolls have the appearance, texture and taste similar to freshly baked rolls.

In one embodiment, an appliance with programmable electronic controls has pre-programmed sequences for different types of bread (smaller or larger, slightly stale or more deeply dehydrated) and desired outcomes (softer crust, crispier crust). The programmed controls can be selected by means of mechanical adjustments like knobs and toggles, or a digital interface including but not limited to an LCD display, touchpad or push buttons. The display can also provide indicators of the systems operational status, including for example the need to refill the water reservoir or any malfunction of one of the components of the system.

The controls can be set in explicit values of the actual step parameters such as duration and temperature, or through proxy setting suggestive of the existing state of desired outcome for the bread, such as "frozen", "light warm-up", "more crust", "large loaf" etc. Multi-stage sequences are easily controlled as well, for example with multiple stages of dry heat at different temperatures, two or more steam stages, or intermittent stand-by or cool-down stages. These are just examples and one skilled in the art can readily understand the range of possibilities for such proxy settings. Customized sequences can be programmed and stored in memory for future repetition.

In some embodiments the excess steam is allowed to escape the main chamber through one or more openings. In some embodiments the escaping steam is guided through a conduit or a passage to a condensing element (i.e., condenser), where the steam is condensed and the water is collected. The condensate can be recovered and guided back to the reservoir or to the steam producing element for reuse.

The invention described is not limited to bread and baked goods. Many other foods can benefit from two step warming as described herein, as the basic kinetics of humidity and heat diffusion apply to other types of food.

Any and all references to publications or other documents, including but not limited to, patents, patent applications, articles, webpages, books, etc., presented anywhere in the present application, are herein incorporated by reference in their entirety.

As noted elsewhere, the disclosed embodiments have been presented for illustrative purposes only and are not limiting. Other embodiments are possible and are covered by the disclosure, which will be apparent from the teachings contained herein. Thus, the breadth and scope of the disclosure should not be limited by any of the above-described embodiments but should be defined only in accordance with claims supported by the present disclosure and their equivalents. Elements from one or another disclosed embodiments may be interchangeable with elements from other disclosed embodiments, and thus, establishing yet further embodiments. Moreover, some further embodiments may be realized by combining one and/or another feature disclosed herein with methods, compositions, systems and devices, and one or more features thereof, disclosed in materials incorporated by reference.

In addition, one or more features/elements of disclosed embodiments may be removed and still result in patentable subject matter (and thus, resulting in yet more embodiments of the subject disclosure). Furthermore, some embodiments correspond to methods, systems, and apparatuses/devices which specifically lack one and/or another element, structure, and/or steps (as applicable), as compared to teachings of the prior art, and therefore represent patentable subject matter and are distinguishable therefrom (i.e. claims directed to such embodiments may contain negative limitations to note the lack of one or more features prior art teachings).

What is currently claimed is:

1. A food conditioning apparatus comprising:
   a water reservoir;
   a heating chamber configured to receive food for conditioning therein, the heating chamber including:
      at least one electrical heating element configured to at least provide dry heat to the chamber via convection, and
      a water inlet nozzle configured to receive water from the reservoir and atomize the water as it enters the chamber;
   and
   a control system configured to automatically operate a sequence of stages including at least a first stage and a subsequent second stage, such that:
      during the first stage,
         the heating element is activated,
         the water inlet nozzle opens for a first duration such that water from the reservoir enters the chamber and is atomized, the inlet opens upon the temperature of the heating element reaching a steam generating temperature, and
         the atomized water is vaporized into steam via the at least one electrical heating element,
      and
      during the second stage,
         the water inlet nozzle is closed for a second duration while the heating element remains activated so as provide dry convection heat to the chamber for the second duration to remove excess moisture from the surface of the food.

2. The apparatus of claim 1, wherein the water reservoir is at least one of refillable and removable.

3. The apparatus of claim 1, wherein the food comprises bread or other baked good.

4. The apparatus of claim 1, wherein the control system is programmable for a plurality of durations for at least one of the stages.

5. The apparatus of claim 1, wherein the control system is programmable for at least one of: temperature, air flow, and steam quantity, of at least one of the stages.

6. The apparatus of claim 1, further comprising a user interface configured to enable selection of one or more attributes of bread including at least one of: size, shape, age, initial condition, and one or more target qualities.

7. The apparatus of claim 6, wherein the target qualities include at least one of crust texture, crust thickness, and internal moisture levels.

8. The apparatus of claim 6, further comprising a display associated with the programmable control system, the display being configured to indicate at least one of a state and a condition of the system.

9. The apparatus of claim 8, wherein the state and/or condition includes at least one of: the current stage, a programmed sequence, and the availability of sufficient water in the water reservoir.

* * * * *